Dec. 13, 1955  L. K. HYDE  2,726,542
INSTRUMENTATION FOR DETERMINING YIELD STRENGTH
OF MATERIALS BY EXTENSION-UNDER-LOAD METHOD
Filed March 10, 1953  2 Sheets-Sheet 1

INVENTOR
LAWRENCE K. HYDE
BY
ATTORNEY

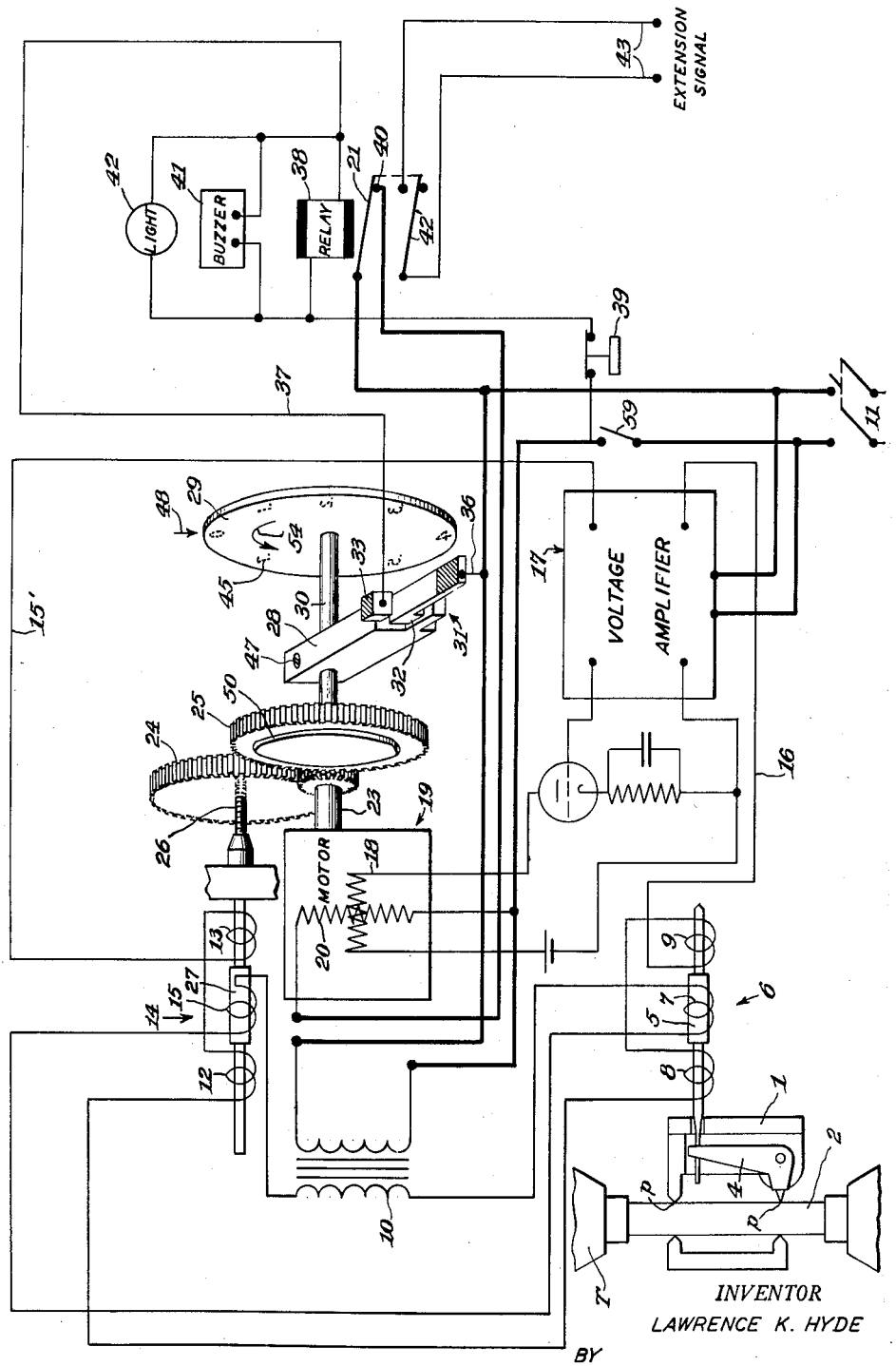

United States Patent Office 2,726,542
Patented Dec. 13, 1955

2,726,542

INSTRUMENTATION FOR DETERMINING YIELD STRENGTH OF MATERIALS BY EXTENSION-UNDER-LOAD METHOD

Lawrence K. Hyde, Washington, D. C., assignor to Baldwin-Lima-Hamilton Corporation, a corporation of Pennsylvania Application March 10, 1953, Serial No. 341,418

9 Claims. (Cl. 73—95)

This invention relates to materials testing instrumentation for determining the yield strength of materials by the extension-under-load method.

Yield strength is generally used instead of elastic limit because the methods for determining the elastic limit are too complicated or involve the use of precision measuring instrumentation that is not practical for routine testing and, also, with many materials the elastic limit cannot be determined. On the other hand, methods used for determining yield strength do not require time consuming precision measurements and the exact value of the yield strength can be definitely determined. The various methods for determining yield strength involve certain arbitrarily selected factors depending upon the kind of material and the particular conditions or circumstances under which the material is to be used. By specifying in materials specifications the values for such factors it is possible to have a common understanding between the materials manufacturer and the customer as to what yield strength the material in question is supposed to have.

One of these methods determines the so-called proportional limit, and another, the offset yield strength, while the approximate yield strength is determined by the extension-under-load method which is employed in my present invention. This last method gives only an approximate yield strength but it is sufficiently satisfactory for the acceptance or rejection of material. Its basis is to take a stress strain diagram from a previous test of a material similar to that in question and then select a value of deformation (extension) which represents the combined or total deformation occurring through the elastic range and up to a point in the plastic range where an arbitrarily selected permanent set results. A line is then drawn from this point parallel to the load ordinate until such line intersects the strain abscissa. This point of intersection represents a certain extension of the specimen in percent of its original gage length. This percentage point is then used in subsequent tests of that particular kind of material so that when that percentage of total elastic and plastic extension occurs in a specimen the approximate yield strength of the material is the load at that instant. Each kind of material will have its own percent of extension to cover the extension up to the point of the arbitrarily selected limiting permanent set. This point is usually agreed upon between a material manufacturer and consumer. The value decided upon for the permanent set should take into consideration the purpose for which the material is to be used.

It is an object of my invention to provide improved instrumentation whereby the yield strength according to the extension-under-load method may be determined in an accurate, expeditious and relatively simple manner.

Another object is to provide such improved instrumentation whereby any one of various extension-under-load percentage points may be selected in a relatively simple manner.

A further object is to provide improved extension-under-load measuring and indicating instrumentation that has a high degree of portability so that certain of its component parts may be located at any point convenient for the operator without in any way interfering with the accuracy, sensitivity, or responsiveness of the instrumentation.

Other objects and advantages will be more apparent to those skilled in the art from the following description of the accompanying drawings in which.

Figure 4:
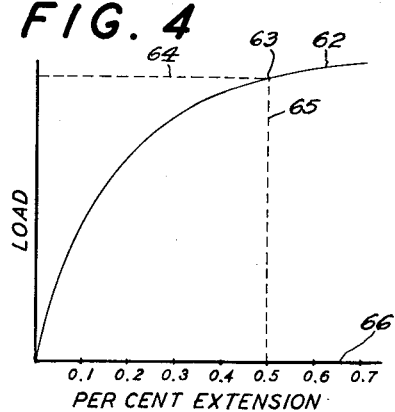

Fig. 4 diagrammatically illustrates a stress-strain diagram and the manner in which the approximate yield strength is determined when the extension-under-load method is employed; and Fig. 5 is a diagrammatic mechanical and electrical diagram of my improved instrumentation.

Figure 1:
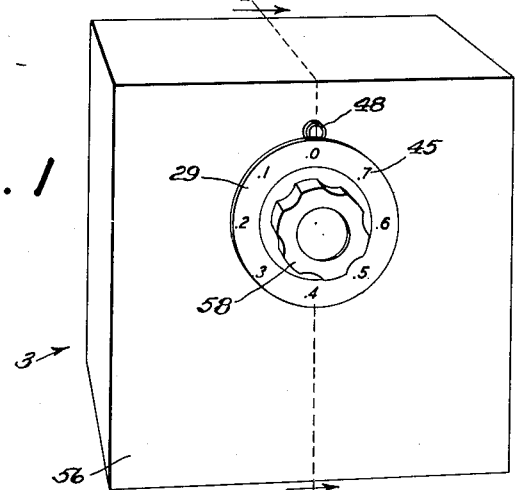
Fig. 1 is a perspective of that portion of my improved instrumentation for measuring the percent of specimen extension and for initiating a signal upon occurrence of such extension.

My invention comprises broadly two component mechanisms, one, an electrical strain (extension) responsive extensometer 1, Fig. 5, for attachment to a tension specimen 2, and, the other, an instrument generally indicated at 3, Fig. 1, to perform the functions of following up the extensometer movements, of providing an extension percentage selector, and of initiating a signal when the extension has reached the desired percentage. The specimen is adapted to be loaded in any suitable materials testing machine diagrammatically represented at T. The extensometer is of the general type shown in Patent 2,427,866 and consists of the extensometer proper having usual spaced gage points $p$ one of which is movable with a pivotal lever 4 for axially moving an armature core 5 in proportion to the extension of the specimen between its gage points. The core is part of an electrical motion-responsive means 6 specifically shown as of the electro-magnetic type disclosed in said patent and having an input coil 7 interposed between output coils 8 and 9. Power is supplied to input coil 7 from one side of a transformer 10 whose other side is connected to a power source 11. As extension occurs in the specimen the core 5 unbalances the motion-responsive device 6 so as to produce an electrical effect or signal current that is transmitted to coils 12 and 13 of a current balancing or follow-up means 14, identical to device 6. This input coil 15 is connected in series with coil 7 and commonly supplied by the transformer 10. The coils 8, 9, 12 and 13 are connected in series and thence by wires 15' and 16 are connected to a voltage amplifier diagrammatically indicated at 17 whose output side is connected to one field 18 of a two-phase motor generally indicated at 19. The other motor winding 20 is connected through a relay switch 21 to the power source 10. Hence, upon occurrence of an extension-responsive current, motor 19 rotates its shaft 23 to drive gearing diagrammatically indicated at 24 and 25. The gear 24 is suitably journaled and has threaded engagement with a non-rotatable but axially movable shaft 26 so that upon rotation of gear 24 a core 27 of the follow-up means 14 is moved axially to tend to restore an electrical balance with the extension-responsive device 6. If this balance should occur the motor 19 would stop rotation but it will be understood that extension in the specimen 2 is normally progressively occurring under a continuously increasing load and accordingly the core 5 will be similarly moved so that a small unbalancing electrical effect will be present throughout a test thereby to cause motor 19 to rotate and effect a constant follow-up action of core 27. During the foregoing rotation of the motor the gear 25 rotates an arm 28 and a dial 29 both rigidly secured to a gear shaft 30. When the arm 28 has rotated upwardly a predetermined distance, corresponding to a pre-selected extension of the specimen, it will close a switch 31 by engaging and moving an electrical contact 32 into engagement with a stationary contact 33 thereby establishing a circuit through a wire 36 from one side of the power source 10 to its other side through a wire 37, a relay 38 and a signal release switch 39 thereby to move switch arm 21 to open a switch contact 40 to motor 19. Simultaneously the operation of any suitable signal is initiated such as a buzzer 41, or a light 42. If desired, another arm 42' of the relay switch may close a contact for any suitable extension signal circuit 43. The arm 28 and switch 31 constitute a signal initiating means while the two electromagnetic devices comprise a pair of electrical motion sensitive devices disposed in electrical opposition to each other so that a current flows between them only when they are electrically unbalanced.

Figure 2:
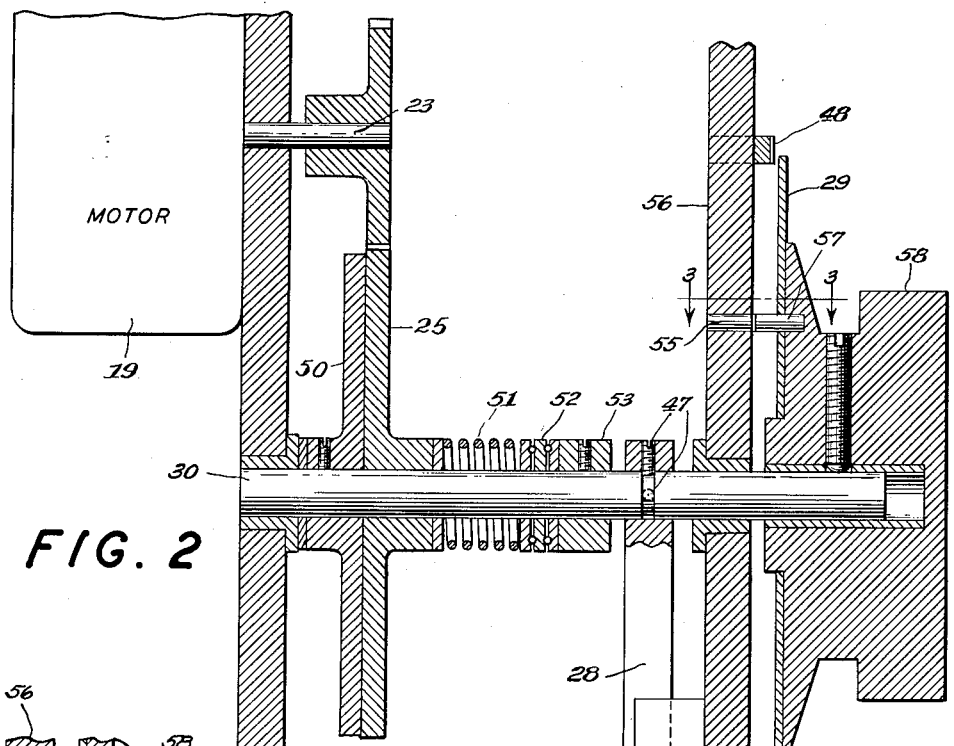
Fig. 2 is a fragmentary sectional view taken substantially in the plane of line 2—2 of Fig. 1.

The dial 29 is suitably graduated as at 45 to indicate various percentages of extension of specimen 2 with respect to its gage length. To adjust the instrument to give a signal, say when the extension of the specimen reaches a percentage of 5/10 percent, a set screw 47, Figs. 2 and 5, in arm 28 will be loosened to permit dial 29 and its shaft 30 to be rotated until the 5/10 percentage point is beneath the zero line 48. The arm 28 will then be angularly adjusted on shaft 30 until it just closes contacts 32 and 33 to produce a signal in circuit 37. The screw 47 will then be tightened and the angular relation between arm 28 and dial 29 will then become fixed for the selected percent of extension.

Figure 3:
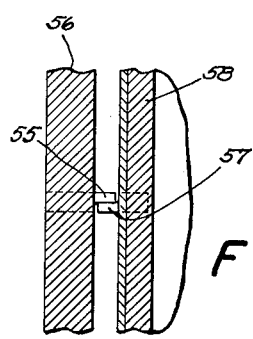
Fig. 3 is a fragmentary plan view taken substantially on the line 3—3 of Fig. 2.

To start a test it is only necessary to bring the extension-responsive and follow-up electrical devices 6 and 14 into electrical balance which will occur automatically through the operation of motor 19 so long as the specimen is not being loaded. However, during this balancing action the motor 19 will drive gear 25 and arm 28 and it is possible that the arm will be driven far enough to close contacts 32 and 33 and thus discontinue operation of motor 19. In this case it is only necessary to manually rotate dial 29 so as to move arm 28 away from contact 32 to permit continued automatic balancing action. The manual rotation can be effected without rotation of motor 19 because of a friction clutch 50 between shaft 30 and gear 25. This friction clutch, Fig. 2, comprises the clutch plate 50 biased into frictional contact with gear 25 by a spring 51 which is supported against a suitable thrust bearing 52 and collar 53 secured to shaft 30. After the electrical system is in balance the dial 29 can be manually rotated to its zero position. The switch actuating arm 28 will then be at its proper distance from contact 32 so that during extension of the specimen the arm will move a distance proportional to the desired percent of extension before engaging contact 32, it being understood that the motor 19 rotates shaft 30 in the direction of arrow 54. To facilitate the zero positioning of dial 29 a stop 55, Fig. 3, is secured in the front cover 56 of the instrument 3 while a similar pin 57 is secured in the dial knob 58, Fig. 2. A motor switch 59 and signal release switch 39 are provided.

To illustrate the extension-under-load method a stress-strain diagram 62 of a material already tested is shown in Fig. 4. If it is arbitrarily decided that such material is to have a specified limiting permanent set corresponding to a point 63, then the yield strength is at the point of intersection of a horizontal line 64 with the load ordinate and the percentage of extension-under-load of the specimen for this yield strength is the point at which a line 65 drawn parallel to the load ordinate intersects the strain abscissa 66. In the illustration this is 5/10 percent extension. In subsequent tests of similar material the dial 30 will be set at 5/10 percent and the specimen then loaded. When th especimen extension equals 5/10 percent the arm 28 will have rotated to close the signal switch for the buzzer, light or other signal and the operator will immediately read the load on the testing machine load dial. The specimen stress at this load reading will constitute the yield strength for that particular specimen. If such load reading is below the specified value of yield strength at 63 the material will be rejected as not being up to specifications.

From the foregoing disclosure it is seen that I have provided an extremely simple, expeditious and accurate apparatus for determining the approximate yield strength in accordance with the extension-under-load method. The functional relationship of the various elements is such that they have a high degree of ruggedness and ease of manipulation while at the same time having a high degree of sensitivity, responsiveness, and stability throughout repetitive operations thus insuring maximum reliability.

It will of course be understood that various changes in details of construction and arrangement of parts may be made by those skilled in the art without departing from the spirit of the invention as set forth in the appended claims.

I claim:

1. Apparatus for determining the approximate yield strength of materials in accordance with the extension-under-load method comprising, in combination, means attachable to a specimen for producing an electrical effect upon occurrence of extension of the specimen under load, means adapted to balance said electrical effect, means controlled by said electrical effect for operating said balancing means whereby so long as the electrical effect persists as a result of continued extension of the specimen the operating means will follow such extension, angularly movable signal initiating means having a predetermined initial angular position before the start of a test and being actuated by said operating means automatically when the extension of the specimen reaches a predetermined percentage of its gage length whereupon the load on the specimen at that instant constitutes the yield strength of the specimen, and means for angularly resetting said signal initiating means to its said initial position.

2. The combination set forth in claim 1 further characterized by the provision of means for adjusting the initial angular position of said angularly movable means for selecting the percent of extension at which the signal is to occur.

3. The combination set forth in claim 1 further characterized by the provision of means for adjusting the signal initiating means so that at the beginning of a test, before load is applied to the specimen, any electrical effect that is present can be balanced out and the signal initiating means set to permit the full predetermined percent of extension when loading of the specimen commences.

4. The combination set forth in claim 1 further characterized in that the means for producing an electrical effect includes an electro-magnetic device with coils and an armature and means for relatively moving the armature and coils in proportion to the extension of the specimen, and the balancing means includes a similar electro-magnetic device in which its coils are connected to the other coils and relative movement between the armature and coils of this last-mentioned electro-magnetic device are effected by the operating means upon occurrence of said electrical effect.

5. The combination set forth in claim 1 further characterized in that the means for producing an electrical effect and the means for balancing the same comprise similar electro-magnetic devices electrically coupled together, and the operating means includes an electric motor controlled by said electrical effect.

6. Apparatus for determining the approximate yield strength of materials in accordance with the extensionunder-load method comprising, in combination, movable means resposive to extension of a specimen, means controlled by said responsive means for following up the movement thereof upon occurrence of extension in a specimen under load, angularly movable means having a predetermined initial angular position before the start of a test and being controlled by said follow-up means for initiating a signal automatically when the extension of a specimen reaches a predetermined percentage of its gage length whereupon the load on the specimen at that instant constitutes the yield strength of the specimen, and means for angularly resetting said signal initiating means to its said initial position.

7. Apparatus for determining the approximate yield strength of materials in accordance with the extension-under-load method comprising, in combination, a pair of electrical motion-sensitive devices disposed in electrical opposition to each other so that when motion occurs in one an unbalancing current flows between them which can be balanced out by a corresponding motion of the other device, means for attaching one of said devices to a specimen so that the attached device is responsive to extension of the specimen when subjected to a load, power means controlled by said unbalancing current for moving the second device to tend to restore an electrical balance between the two devices, means having a predetermined initial angular position before the start of a test and being movable by said power means for initiating a signal automatically when the extension of the specimen reaches a predetermined percentage of its gage length whereupon the load on the specimen at that instant constitutes the yield strength of the specimen, and angularly movable means for resetting said signal initiating means to its said initial position upon completion of the test.

8. Apparatus for determining the approximate yield strength of materials in accordance with the extension-under-load method comprising, in combination, a pair of electrical motion sensitive devices disposed in electrical opposition to each other so that when motion occurs in one an unbalancing current flows between them which can be balanced out by a corresponding motion of the other device, means for attaching one of said devices to a specimen so that the attached device is responsive to extension of the specimen when subjected to a load, power means controlled by said unbalancing current for moving the second device to tend to restore an electrical balance between the two devices, a rotatable shaft, a friction driving connection between the power means and shaft for rotating the latter in proportion to the extension of the specimen, an electrical switch for initiating a signal, and an arm on said shaft for controlling said switch so as to initiate a signal when the extension of the specimen reaches a predetermined percent of its gage length.

9. Apparatus for determining the approximate yield strength of materials in accordance with the extension-under-load method comprising, in combination, a pair of relatively movable electrical motion sensitive devices disposed in electrical opposition to each other and adapted when relatively stationary to be in electrical balance before the start of a test so that when motion occurs in one of the devices an unbalancing current flows between them which can be balanced out by a corresponding motion of the other device, means for attaching one of said devices to a specimen so that the attached device is responsive to extension of the specimen when subjected to a load, power means controlled by said unbalancing current for moving the second device to tend to restore an electrical balance between the two devices, a rotatable shaft having a predetermined initial angular position, a friction driving connection between the power means and shaft for rotating the latter from said initial position in proportion to the extension of the specimen, an electrical switch for initiating a signal, an arm fixed on said shaft to rotate therewith from its initial position for controlling said switch so as to initiate a signal when the extension of the specimen reaches a predetermined percent of its gage length, and manually operable means for rotating said shaft by slipping said friction drive while the power means remains inactive thereby to allow initial positioning of said switch arm when said motion-sensitive devices are in electrical balance before the start of a test.

References Cited in the file of this patent
UNITED STATES PATENTS

| | | |
|---|---|---|
| 2,091,534 | Templin | Aug. 31, 1937 |
| 2,217,080 | Ruch | Oct. 8, 1940 |
| 2,225,420 | Mandl | Dec. 14, 1940 |
| 2,445,683 | Macgeorge | July 20, 1948 |
| 2,560,135 | Shearer | July 10, 1951 |
| 2,614,185 | Henry | Oct. 14, 1952 |